March 11, 1930.  W. R. HENDRIX  1,749,816
STEERING MECHANISM
Filed July 20, 1927  2 Sheets-Sheet 1
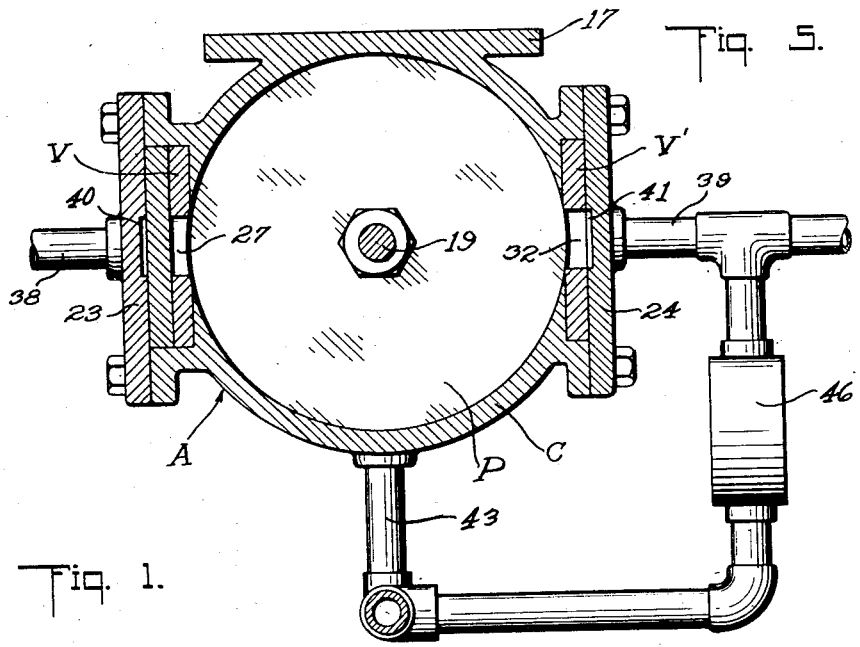
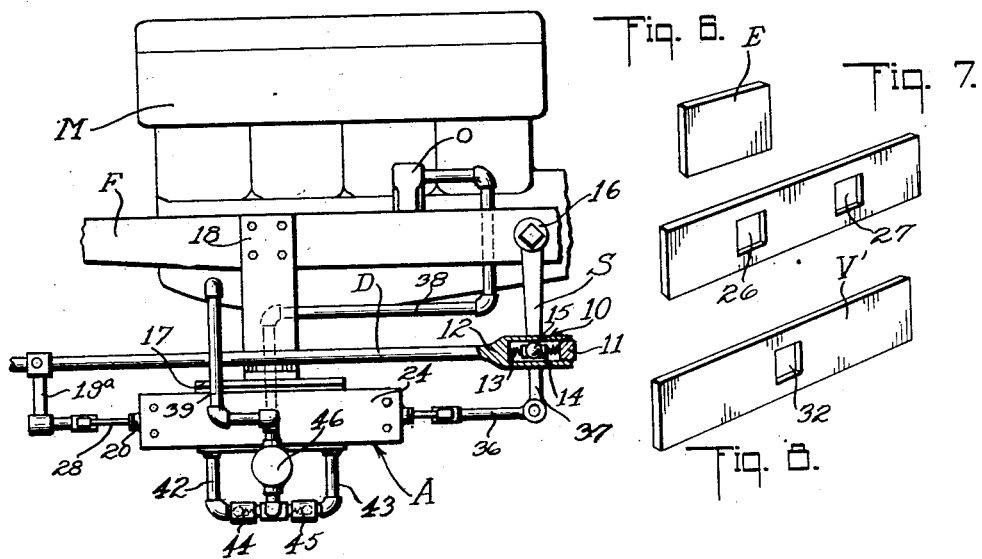
INVENTOR.
William R. Hendrix;
BY Munn & Co.
ATTORNEYS.

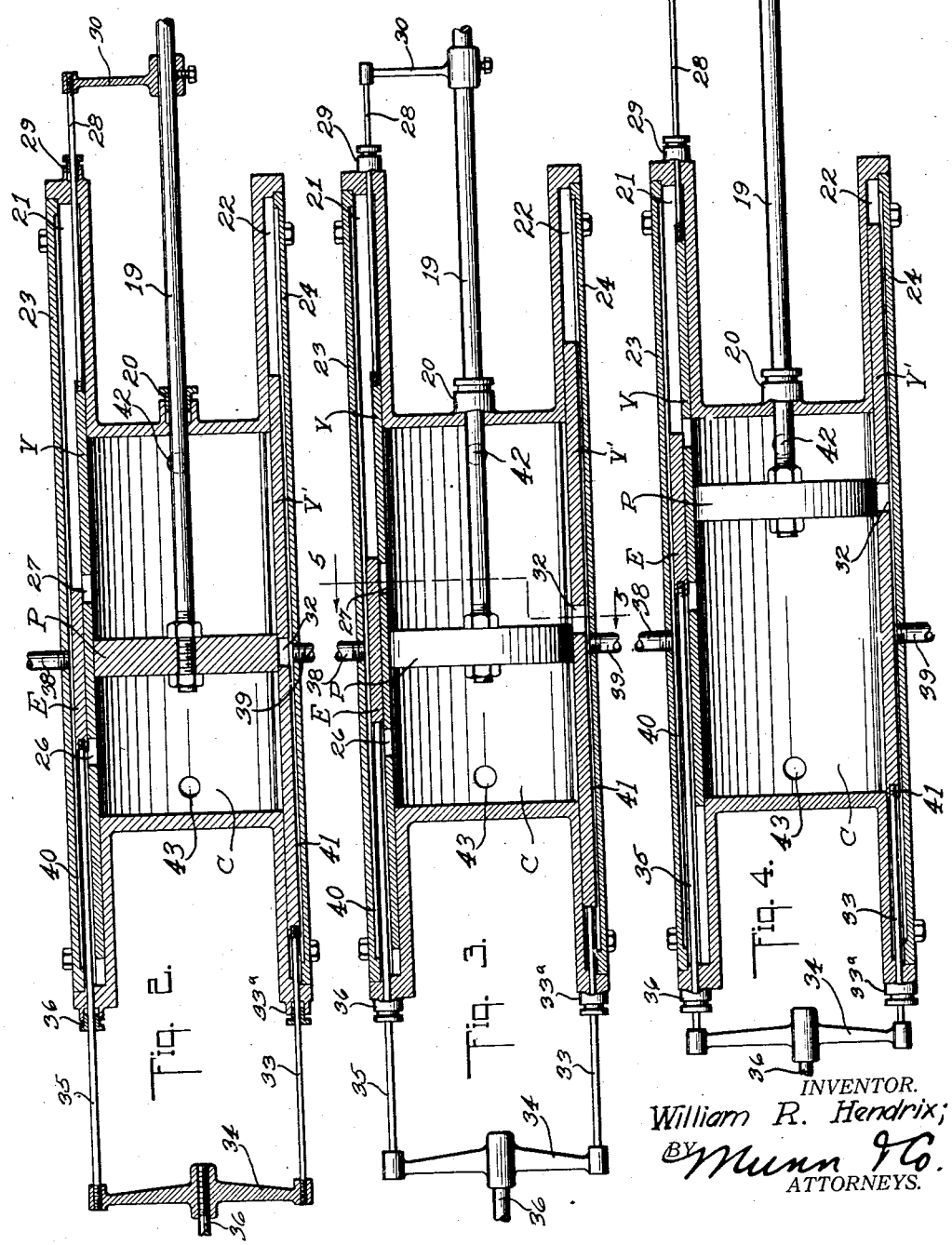

Patented Mar. 11, 1930

1,749,816

UNITED STATES PATENT OFFICE

WILLIAM R. HENDRIX, OF PACIFIC PALISADES, CALIFORNIA, ASSIGNOR OF ONE-HALF TO HOWARD ANDERSON HYDE, OF SANTA MONICA, CALIFORNIA

STEERING MECHANISM

Application filed July 20, 1927. Serial No. 207,263.

My invention relates generally to steering mechanisms for vehicles, and the primary purpose of my invention is the provision of a steering mechanism by which the operator of the vehicle will be relieved of the manual labor of steering and can accomplish this operation with practically no effort regardless of whether the vehicle is in motion or at a standstill, so that in parking the vehicle, for example, the usually laborious steering operations necessary can be accomplished with ease and dispatch.

It is also a purpose of my invention to provide a steering mechanism in which is embodied an actuating unit preferably, although not necessarily, hydraulic, and responsive to pressure from a source of pressure supply such as for instance the oil pump of the vehicles' motor to effect the actual steering of the vehicle, the unit preferably being controlled by the operator in such manner that movement of the steering wheel of the vehicle will result in a corresponding steering of the vehicle by the actuating unit.

I will describe only one form of steering mechanism embodying my invention, and will then point out the novel features in claims.

In the accompanying drawings:

Figure 1 is a view in side elevation showing one form of steering mechanism in applied position to a motor vehicle;

Figures 2, 3 and 4 are enlarged longitudinal horizontal sectional views of the actuating unit embodied in my invention and illustrating various positions occupied by its moving parts;

Figure 5 is a sectional view taken on the lines 5—5 of Figure 2, and Figures 6, 7 and 8 are detail perspective views of a control element and inlet and outlet valves respectively embodied in the actuating unit.

Referring specifically to the drawings in which similar reference characters designate similar parts in each of the several views, my invention in its present embodiment is shown applied to a motor vehicle and is associated with its steering mechanism which is of conventional form with the exception that the usual ball and socket connection 10 between its steering arm S and drag link D is so adjusted as to permit of a limited relative movement between the two for a purpose to be hereinafter fully described. This adjustment is accomplished by backing off the retaining nut 11 in the head 12 of the drag link to reduce the tension of the opposed coil springs 13 upon the socket sections 14 engaging the ball 15 formed on the steering arm, thus allowing the latter to be rocked a small amount about its pivotal point 16 on the chassis frame F and compressing the springs 13 without transmitting movement to the drag link.

In its present embodiment my invention comprises an actuating unit designated generally at A and consisting of a cylinder C having its ends closed and its upper side formed with a flat pad 17 to which is secured a bracket 18 for rigidly supporting the unit from the chassis frame F in a horizontal position below the frame and drag link D and at a point in advance of the steering arm S.

Reciprocable in the cylinder is a piston P to which is secured a piston rod 19 projecting through a gland 20 at one end of the cylinder for rigid operative connection by means of an arm 19, to the drag link D, so that any reciprocatory motion of the piston is directly transmitted to the drag link to effect steering of the vehicle.

As shown in Figures 2 to 4 inclusive the ends of the cylinder at its opposite sides are extended to provide a pair of elongated pockets 21 and 22 extending longitudinally of and along the sides of the cylinder which communicate with the interior of the latter throughout its length as shown in Figure 5. The outer sides of the pockets are hermetically closed by means of cover plates 23 and 24, and freely reciprocable in the pocket 21 is an inlet valve in the form of a rectangular plate having a pair of inlet ports 26 and 27 communicating at all times with the interior of the cylinder at opposite sides of the piston P. An actuating rod 28 is secured to one end of the valve V and projects through a gland 29 at the forward end of the cylinder for rigid operative connection to the piston rod 19 by means of an arm 30, so that any movement of the rod effects a corresponding movement of the valve V.

Freely reciprocable in the pocket 22 is an outlet valve V' also in the form of a rectangular plate having a single port 32 of such length as to be spanned by the piston P and in the normal position of the latter as shown in Figure 2 is closed by the piston. An actuating rod 33 is secured to one end of the valve V' and projects through a gland 33$^a$ at the rear end of the cylinder for rigid operative connection to one end of a cross head 34. To the other end of the crosshead is secured an actuating rod 35 projecting through a gland 36 in the rear end of the cylinder and into the pocket 21 where it is connected to a control element E in the form of a relatively short rectangular plate reciprocable in the pocket and interposed between the outer face of the valve V and the inner side of the cover plate 23. The control element E is of such length that in the normal position of the piston it only partly closes the inlet ports 26 and 27 as clearly shown in Figure 2.

The crosshead 34 is rigidly connected to the lower end of the steering arm S at a point below the drag link D by means of a connecting rod 36 and an arm 37, to the end that any movement of the steering arm will effect a corresponding movement of both the outlet valve V and the control element E.

In its present embodiment the actuating unit A is shown in circuit communication with the conventional oil pump O of the motor M of the vehicle, a pipe 38 extending from the pressure side of the pump and being connected to the cover plate 23 so as to establish communication between the pocket 21 and the pipe. An outlet pipe 39 is connected to the cover plate 24 and leads to the crankcase of the motor from whence oil is drawn by the pump to lubricate working parts of the motor as is conventional. It will be noted that the inner sides of the cover plates 23 and 24 are grooved longitudinally as indicated at 40 and 41 respectively so that the control element E and outlet valve V' will not obstruct the passage of oil to and from the pockets 21 and 22 respectively regardless of the positions occupied by the element and valves.

As shown in Figure 1 branch pipes 42 and 43 constituting relief pipes extend from the outlet pipe 39 and lead to the cylinder adjacent its opposite ends, and interposed in the branch pipes are check valves 44 and 45 of conventional form opening outwardly of the cylinder, while a suitable pressure regulator 46 is interposed in the outlet pipe.

The operation of the steering mechanism is as follows:

With the motor M in operation its oil pump O draws oil from the crankcase of the motor and delivers it under pressure to the pipe 38, and with the piston P, valves V and V' and control element E occupying the position shown in Figure 2, oil will be forced into the pocket 21 and through the partly open inlet ports 26 and 27 of the valve V into the cylinder at opposite sides of the piston P. Due to the fact that the outlet port 32 of the valve V' is closed by the piston, the oil will fill the cylinder and exert equal pressures on opposite sides of the piston and thus maintain the latter in fixed position in the cylinder to lock the drag link D and consequently the steering mechanism against movement.

Under this condition the continuous operation of the oil pump will build up the pressure of oil within the cylinder and upon the pressure reaching a predetermined amount the pressure regulator 46 functions to allow oil to be bypassed through the relief pipes 42 and 43 and returned to the crankcase so that damage to with possible bursting of the cylinder is thus positively prevented.

In the operation of steering the vehicle, the initial movement of its steering wheel by the operator will effect movement of the steering arm, and through the medium of the arm 37, crosshead 34, connecting rod 36 and actuating rods 33 and 35 correspondingly move the control element E and the outlet valve V' from the position shown in Figure 2 to that shown in Figure 3, so that the inlet port 27 will be closed by the control element and the outlet port 32 will be opened to establish communication between the interior of the cylinder at one side of the piston and the outlet pipe 39. This intitial movement of the steering arm S to effect these movements of the control element and outlet valve is ineffective to actuate the drag link D due to the lost motion connection between the link and arm previously described.

Due to the fact that the inlet port 26 and the outlet port 32 are open to the interior of the cylinder at opposite sides of the piston, oil entering the inlet port 26 from the pump will act against the piston and will be free to move the latter, the oil at the other side of the piston being forced by the latter through the outlet port 32 into the outlet pipe 39 and ultimately returned to the crankcase.

The movement of the piston by the oil will be continued so long as the operator continues to move the steering wheel and maintains the relation of the control element E and valves V and V' shown in Figure 3 so that the drag link will be actuated by the piston to effect the desired steering of the vehicle. However when the operator ceases to move the steering wheel and thereby stops the movement of the control element E and outlet valve V' which, for example will be considered occurs when these parts are in the position shown in Figure 4, a slight further movement of the piston by the oil will cause it to again close the outlet port 32, the inlet ports 26 and 27 of the valve V again assuming the relation to the control element as shown in Figure 2, thus again admitting oil to both sides of the piston and locking the piston and hence the steering mechanism against movement.

It will be clear that a reverse movement of the steering wheel by the operator will cause the control element to close the inlet port 26 and open the outlet port 32 to the interior of the cylinder at the other side of the piston, so that the oil will act to move the piston in a direction reverse to its previously described movement and thus reversely actuate the drag link.

From the foregoing description it will be manifest that the operator is relieved of the usual heavy duty in steering the vehicle and that so long as the vehicle's motor is operating it is only necessary for him to apply sufficient turning pressure to the wheel to actuate the control element E and outlet valve V', the piston P automatically following this movement so to speak, and operating the drag link to effect the actual steering. Furthermore it will be clear that although hydraulic pressure is relied upon to steer and maintain the vehicle on a desired course, the steering operation remains under the direct control of the operator so that should the actuating unit fail to function through leakage or breakage of an oil line the operator can then manually steer the vehicle in the usual manner due to the fact that the operative connection between the steering arm and drag link is not disrupted.

Although I have herein shown and described only one form of steering mechanism embodying my invention, it is to be understood that various changes and modifications may be made herein without departing from the spirit of the invention and the spirit and scope of the appended claims.

I claim as my invention:

1. In combination, a steering mechanism for vehicles including a drag link and a steering arm operatively connected to the link for a limited relative movement between the two, an oil pump, and an actuating unit comprising a cylinder in circuit communication with the pump, a piston in the cylinder operatively connected to the drag link for moving the latter to effect steering of the vehicle, an inlet valve in the cylinder operatively connected to the piston for movement therewith and having a pair of ports through which oil from said pump is admitted to the cylinder at opposite sides of the piston, an outlet valve in the cylinder having a port controlled and normally closed by the piston, through which oil at one side or the other of the piston is adapted to be discharged according as the outlet valve is moved in one direction or the other to open its port to the cylinder at one side of the piston or the other, and an element for controlling the ports of the inlet valve and normally occupying a position in which the ports are open, the outlet valve and control element being operatively connected to the steering arm for movement thereby and responsive to movement of the arm to respectively close one of said inlet valve ports and open the outlet valve port so that oil from the pump will be free to enter the cylinder through the other inlet valve port to act against one side of the piston, while oil at the other side of the piston will be free to discharge from the cylinder through the outlet valve port, whereby the piston will be moved to actuate the drag link and will continue to actuate the latter so long as the outlet valve port and one of the inlet valve ports are maintained open by continued movement of the steering arm.

2. The combination as embodied in claim 1 wherein means is provided and is operable when the valves are in normal position to by-pass oil from both sides of the cylinder to the pump when predetermined pressure on the oil in the cylinder is reached.

3. In a steering mechanism for vehicles, an actuating unit comprising a cylinder having an inlet adapted to be connected to a source of fluid supply under pressure and provided with an outlet, a piston in the cylinder, an inlet valve in the cylinder operatively connected to the piston for movement thereby and provided with a pair of ports through which fluid from the source of supply is adapted to be admitted to the interior of the cylinder at opposite sides of the piston, an outlet valve in the cylinder having a port controlled by the piston, and an element operatively connected to the outlet valve for movement therewith and controlling said inlet ports, said element and outlet valve normally occupying a position in which both of said inlet ports will be open and said outlet valve will be closed by the piston so that fluid from the source of pressure supply will be admitted to the cylinder at both sides of the piston and when equalized will lock the latter against movement, said element and outlet valve operating when moved in one direction or the other to respectively close one of the inlet ports and open the outlet port to the cylinder at the same side of the piston to which the inlet port is closed, whereby fluid from the source of supply will be free to enter the open inlet port and move the piston while oil in the cylinder in advance of the piston will be discharged through the outlet port.

4. In a steering mechanism for vehicles, an actuating unit comprising a cylinder having an inlet adapted to be connected to a source of fluid supply under pressure and provided with an outlet, a piston in the cylinder, an inlet valve in the cylinder operatively connected to the piston for movement thereby and provided with a pair of ports through which fluid from the source of supply is adapted to be admitted to the interior of the cylinder at opposite sides of the piston, an outlet valve in the cylinder having a port controlled by the piston, and an element operatively connected to the outlet valve for movement therewith and controlling said inlet ports, said element and outlet valve normally occupying a position in which both of said inlet ports will be open and said outlet valve will be closed by the piston so that fluid from the source of pressure supply will be admitted to the cylinder at both sides of the piston and when equalized will lock the latter against movement, said element and outlet valve operating when moved in one direction or the other to respectively close one of the inlet ports and open the outlet port to the cylinder at the same side of the piston to which the inlet port is closed, whereby fluid from the source of supply will be free to enter the open inlet port and move the piston while oil in the cylinder in advance of the piston will be discharged through the outlet port, said piston operating when movement of the element and outlet valve is discontinued, to close the outlet port and move said inlet valve to a position in which both inlet ports will again be open.

5. In a steering mechanism for vehicles, an actuating unit comprising a cylinder having an inlet adapted to be connected to a source of fluid supply under pressure and provided with an outlet, a piston in the cylinder, valved means in the cylinder operatively connected to the piston for movement thereby and through which fluid from the source of supply is adapted to be admitted to the interior of the cylinder at opposite sides of the piston, a second valved means in the cylinder through which fluid is adapted to be discharged from the cylinder and controlled by the piston, and means operatively connected to the second valved means for movement therewith and controlling the first valved means, said last means and second valved means normally occupying a position in which fluid will be admitted to opposite sides of the cylinder through the first valved means and the piston will prevent the discharge of fluid through the second valved means so that the piston will be locked against movement when the fluid pressure on both sides of the piston is equalized, said last means and second valved means operating when moved in one direction or the other to respectively admit fluid from the source of supply to only one side of the piston through the first valved means and allow the discharge of fluid from the cylinder at the other side of the piston through the second valved means, whereby movement of the piston by the fluid will be effected.

6. In a steering mechanism for vehicles, an actuating unit comprising a cylinder having an inlet adapted to be connected to a source of fluid supply under pressure and provided with an outlet, a piston in the cylinder, valved means in the cylinder operatively connected to the piston for movement thereby and through which fluid from the source of supply is adapted to be admitted to the interior of the cylinder at opposite sides of the piston, a second valved means in the cylinder through which fluid is adapted to be discharged from the cylinder and controlled by the piston and means operatively connected to the second valved means for movement therewith and controlling the first valved means, said last means and second valved means normally occupying a position in which fluid will be admitted to opposite sides of the cylinder through the first valved means and the piston will prevent the discharge of fluid through the second valved means so that the piston will be locked against movement when the fluid pressure on both sides of the piston is equalized, said last means and second valved means operating when moved in one direction or the other to respectively admit fluid from the source of supply to only one side of the piston through the first valved means and allow the discharge of fluid from the cylinder at the other side of the piston through the second valved means, whereby movement of the piston by the fluid will be effected, said piston operating when movement of said last means and second valved means is discontinued, to prevent the discharge of fluid through the second valved means and to move the first valved means to a position in which fluid will again be admitted to the cylinder at opposite sides of the piston through the first valved means.

7. In combination, a steering mechanism for vehicles, and an actuating unit for the mechanism comprising a cylinder having an inlet adapted for connection to a source of fluid supply under pressure and provided with an outlet, a piston in the cylinder operatively connected to one of the parts of the steering mechanism for actuating said part in response to fluid admitted to the cylinder and thereby effect steering of the vehicle, means operatively associated with the piston by which fluid from the source of supply is adapted to be admitted to the cylinder at one side of the piston or the other, means operatively associated with another part of the steering mechanism and controlled by the piston by which fluid is adapted to be discharged from the cylinder, and means operatively associated with said other part of the steering mechanism for controlling the admission of fluid to the cylinder by the first means, the last means and second means operable respectively to admit fluid to the cylinder at one side of the piston or the other and to allow fluid to be discharged from the other side of the cylinder, or vice versa, according as said other part of the steering mechanism is moved to one position or another, whereby the piston will be moved in one direction or the other to actuate the first said part of the steering mechanism and thereby steer the vehicle in one direction or the other.

8. In combination, a steering mechanism for vehicles, and an actuating unit for the mechanism comprising a cylinder having an inlet adapted for connection to a source of fluid supply under pressure and provided with an outlet, a piston in the cylinder operatively connected to one of the parts of the steering mechanism for actuating said part in response to fluid admitted to the cylinder and thereby effect steering of the vehicle, means operatively associated with the piston by which fluid from the source of supply is adapted to be admitted to the cylinder at one side of the piston or the other, means operatively associated with another part of the steering mechanism and controlled by the piston by which fluid is adapted to be discharged from the cylinder, and means operatively associated with said other part of the steering mechanism for controlling the admission of fluid to the cylinder by the first means, the last means and second means operable respectively to admit fluid to the cylinder at one side of the piston or the other and to allow fluid to be discharged from the other side of the cylinder, or vice versa, according as said other part of the steering mechanism is moved to one position or another, whereby the piston will be moved in one direction or the other to actuate the first said part of the steering mechanism and thereby steer the vehicle in one direction or the other, the piston operating when movement of said other part of the steering mechanism is discontinued, to prevent the discharge of fluid by the second means while the first means operates to admit fluid to the cylinder at opposite sides of the piston, to thereby lock the latter against movement.

9. In combination, a steering mechanism for vehicles including a drag link and a steering arm operatively connected to the link, and an actuating unit comprising a cylinder having an inlet adapted for connection to a source of fluid supply under pressure and provided with an outlet, a piston in the cylinder operatively connected to the drag link for actuating the latter to effect steering of the vehicle, valved means operatively associated with the piston for movement in response to movement of the latter, and by which fluid is adapted to be admitted to the cylinder at opposite sides of the piston, a second valved means operatively associated with the steering arm and controlled by the piston by which fluid is adapted to be discharged from the cylinder, and means operatively associated with the steering arm for controlling the admission of fluid to the cylinder by the first valved means, the last means and second valved means operating respectively to admit fluid to the cylinder at one side of the piston or the other and allow the discharge of fluid from the cylinder at the other side of the piston, or vice versa, according as the steering arm is moved in one direction or the other, whereby movement of the piston in one direction or the other to actuate the drag link and thereby steer the vehicle in one direction or the other, will be effected.

10. In combination, a steering mechanism for vehicles including a drag link and a steering arm operatively connected to the link, and an actuating unit comprising a cylinder having an inlet adapted for connection to a source of fluid supply under pressure and provided with an outlet, a piston in the cylinder operatively connected to the drag link for actuating the latter to effect steering of the vehicle, valved means operatively associated wtih the piston for movement in response to movement of the latter, and by which fluid is adapted to be admitted to the cylinder at opposite sides of the piston, a second valved means operatively associated with the steering arm and controlled by the piston by which fluid is adapted to be discharged from the cylinder, and means operatively associated with the steering arm for controlling the admission of fluid to the cylinder by the first valved means, the last means and second valved means operating respectively to admit fluid to the cylinder at one side of the piston or the other and allow the discharge of fluid from the cylinder at the other side of the piston, or vice versa, according as the steering arm is moved in one direction or the other, whereby movement of the piston in one direction or the other to actuate the drag link and thereby steer the vehicle in one direction or the other, will be effected, the piston operating when movement of the steering arm is discontinued, to prevent the discharge of fluid by the second valved means and to move the first valved means to a position in which fluid will be admitted to the cylinder by the first valved means at opposite sides of the piston, to thereby lock the latter against movement when the fluid pressure on both sides of the piston is equalized.

11. In a steering mechanism for vehicles, an actuating unit comprising a cylinder having an inlet adapted for connection to a source of fluid supply under pressure and provided with an outlet, a piston in the cylinder, means by which fluid from the source of supply is adapted to be admitted to the cylinder at both sides of the piston, a second means by which fluid is adapted to be discharged from the cylinder, and means for controlling the admission of fluid to the cylinder by the first means, the last means and second means operating respectively to admit fluid to the cylinder at one side of the piston or the other and allow the discharge of fluid from the cylinder at the other side of the piston or vice versa, according as the last means and second means are moved to one position or another, whereby movement of the piston in one direction or another will be effected.

12. In a steering mechanism for vehicles, an actuating unit comprising a cylinder having an inlet adapted for connection to a source of fluid supply under pressure and provided with an outlet, a piston in the cylinder, means by which fluid from the source of supply is adapted to be admitted to the cylinder at both sides of the piston, a second means by which fluid is adapted to be discharged from the cylinder, and means for controlling the admission of fluid to the cylinder by the first means, the last means and second means operating respectively to admit fluid to the cylinder at one side of the piston or the other and allow the discharge of fluid from the cylinder at the other side of the piston or vice versa, according as the last means and second means are moved to one position or another, whereby movement of the piston in one direction or another will be effected, the piston operating when movement of the last means and second means is discontinued, to prevent the discharge of fluid by the second means while the first means operates to admit fluid to the cylinder at opposite sides of the piston, to thereby lock the latter against movement when the fluid pressure on both sides of the piston is equalized.

13. In a steering mechanism for vehicles, an actuating unit comprising a cylinder having an inlet adapted for connection to a source of fluid supply under pressure and provided with an outlet, a piston in the cylinder, valved means by which fluid from the source of supply is admitted to the cylinder at opposite sides of the piston, a second valved means controlled by the piston by which fluid is discharged from the cylinder, and means for controlling the admission of fluid from the source of supply to the cylinder by the first valved means, the last means and second valved means normally occupying positions in which fluid will be admitted to opposite sides of the cylinder by the first valved means and the piston will prevent the discharge of fluid by the second valved means so that the piston will be locked against movement when the fluid pressure on both sides of the piston is equalized, the last means and second valved means operating when moved to one position or another to respectively allow fluid from the source of supply to be admitted to only one side of the piston by the first valved means and allow the discharge of fluid from the cylinder at the other side of the piston by the second valved means, whereby movement of the piston by the fluid will be effected.

14. In a steering mechanism for vehicles, an actuating unit comprising a cylinder having an inlet adapted for connection to a source of fluid supply under pressure and provided with an outlet, a piston in the cylinder, valved means operatively associated with the piston for movement thereby by which fluid from the source of supply is admitted to the cylinder at opposite sides of the piston, a second valved means controlled by the piston by which fluid is discharged from the cylinder, and means for controlling the admission of fluid from the source of supply to the cylinder by the first valved means, the last means and second valved means normally occupying positions in which fluid will be admitted to opposite sides of the cylinder by the first valved means and the piston will prevent the discharge of fluid by the second valved means so that the piston will be locked against movement when the fluid pressure on both sides of the piston is equalized, the last means and second valved means operating when moved to one position or another to respectively allow fluid from the source of supply to be admitted to only one side of the piston by the first valved means and allow the discharge of fluid from the cylinder at the other side of the piston by the second valved means, whereby movement of the piston by the fluid will be effected, said piston operating when movement of the last means and second valved means is discontinued, to prevent the discharge of fluid by the second valved means and to move the first valved means to a position in which fluid will again be admitted to the cylinder at both sides of the piston by the first valved means.

15. In a steering mechanism for vehicles, an actuating unit comprising a cylinder having an inlet and an outlet, a piston in the cylinder, means for delivering fluid under pressure to said inlet, valved means by which fluid from the source of supply is admitted to the cylinder at opposite sides of the piston, a second valved means controlled by the piston by which fluid is discharged from the cylinder, means for controlling the admission of fluid from the source of supply to the cylinder by the first valved means, the last means and second valved means normally occupying positions in which fluid will be admitted to opposite sides of the cylinder by the first valved means and the piston will prevent the discharge of fluid by the second valved means so that the piston will be locked against movement when the fluid pressure on both sides of the piston is equalized, the last means and second valved means operating when moved to one position or another to respectively allow fluid from the source of supply to be admitted to only one side of the piston by the first valved means and allow the discharge of fluid from the cylinder at the other side of the piston by the second valved means, whereby movement of the piston by the fluid will be effected, and means operable when the piston is locked against movement to relieve the cylinder at both sides of the piston from pressure of the fluid therein in excess of a predetermined pressure.

WILLIAM R. HENDRIX.